April 20, 1954 W. F. ALLER ET AL 2,675,622
GAUGING DEVICE
Filed Feb. 26, 1952 5 Sheets-Sheet 2

INVENTORS
WILLIS FAY ALLER
DAVID H. McCONNELL
BY
DES JARDINS, ROBINSON & KEISER

THEIR ATTORNEYS

INVENTORS
WILLIS FAY ALLER
DAVID H. McCONNELL
BY DES JARDINS, ROBINSON & KEISER

Howard Keiser
THEIR ATTORNEY

Patented Apr. 20, 1954

2,675,622

UNITED STATES PATENT OFFICE 2,675,622

GAUGING DEVICE

Willis Fay Aller and David H. McConnell, Dayton, Ohio, assignors to The Sheffield Corporation, Dayton, Ohio, a corporation of Ohio Application February 26, 1952, Serial No. 273,374

28 Claims. (Cl. 33—148)

1

This invention relates to improvements in gauging devices and, more particularly, to gauging devices of the comparator type in which the parts being gauged are compared in size with a master or standard, and the oversize or undersize condition of the part indicated on a reading scale so that the operator of the gauging device may tell at a glance the size of the part, or whether or not the part is within the specified tolerance.

Gauges of the type in which the flow of fluid through an orifice is used as a measure of the size of the part being gauged, as compared with a standard, have certain significant advantages over the more conventional types of gauging devices in which mechanical movements are utilized for indicating the oversize or undersize condition of the parts being gauged. For example, they are more sensitive and afford much greater amplification of deviations from standard than the latter types, and they are also simpler and more sturdy than the mechanical gauges. As a result, pneumatic comparator gauges are finding extensive use in the precision gauging of all sorts of production parts which must be held to close tolerances. However, existing types of pneumatic comparator gauges usually require the use of costly gauging heads which must be specially designed for each particular gauging operation. This has to some extent restricted the use of the pneumatic gauging devices to situations in which large quantities of identical or similar parts require precision checking. The expense involved in the construction of these pneumatic gauging heads has been due, in large part, to the fact that the fluid discharge orifices have been made an integral part of the anvils or workpiece contacting elements. This type of construction requires complicated, precision tooling of the heads. In order to eliminate this difficulty, we propose to provide a gauging device in which the fluid metering portion of the apparatus is divorced from the anvil or gauging head so that the gauge may be changed over from one job to another by merely effecting a change in the anvils. In this way, the anvil construction is considerably simplified and the fluid metering portion of the gauge remains unchanged and may be used for all types of gauging operations regardless of the character or shape of the part being checked. Hence, our novel form of gauging device is more flexible in operation and less expensive to adapt to the various types of gauging operations which are normally encountered in the production gauging of different production parts.

2

Accordingly, it is an object of the present invention to provide a novel type of gauging device which is particularly suited to the rapid and precise gauging of small, mass-produced parts.

Another object of the invention is to provide a fluid operated gauge which is more readily adaptable to the gauging of different sorts of production parts than are existing gauges of this type.

Another object of the invention is to provide a fluid-flow comparator gauge in which the fluid metering device is independent of, and divorced from, the gauging anvils so that the gauge may be set up for different gauging operations merely by changing or adjusting the anvils.

Another object of the invention is to provide a comparator gauge of the fluid-flow type in which the work contacting anvils are adjustably and detachably secured in place, and in which the fluid-flow metering element is adjustable with respect to the anvils so that the gauge can be readily adapted to the gauging of parts of different shapes and sizes.

Another object of the invention is to provide a gauging device having means for facilitating the movement of the parts being checked to and from the gauging anvils.

Another object of the invention is to provide a comparator gauge of the fluid-flow type in which the anvils are adapted to contact the workpiece under a constant pressure.

Another object of the invention is to provide a comparator gauge of the character set forth in the preceding object in which a gravity-operated anvil is carried by an arm mounted for pivotal movement on a substantially frictionless bearing.

Another object of the invention is to provide a gauge of the character mentioned having a manually controlled member operably connected to the movable work engaging anvil, so arranged that varying degrees of pressure on the manually controlled member have no effect on the gauge indication.

The gauging device which we have designed to accomplish the foregoing objects comprises a base on which are mounted an anvil and a fluid discharge orifice, the anvil being removably secured to the base, and the orifice being permanently installed in the base so that the anvil may be removed and replaced by a different anvil without disturbing the orifice. Also supported on the base is a pivoted arm which, at its free end, carries a second anvil which is adapted to cooperate with the stationary anvil in gauging the size of the part to be checked. This arm also carries a metering pin which lies above the orifice and cooperates therewith to control the flow of fluid through the orifice when the second, or movable anvil, is brought into contact with the part being gauged. The oversize or undersize condition of the part being checked may be read from a fluid-flow indicator connected in the fluid supply line in series with the orifice in the well-known manner. This visual indicator may be of any desired type.

The pivoted arm on which the second anvil and metering pin are mounted is journaled on the base to turn about a horizontal axis, and the pivot bearing for this arm is so constructed as to eliminate end play and insure substantially frictionless turning of the arm about its pivot. The arm is permitted to move downwardly toward the workpiece under the influence of gravity, and the novel pivot bearing which we have designed will permit the anvil carried by the arm to contact the workpiece with precisely the same pressure and in precisely the same location for each part being checked. This is an important feature of our novel gauging device since, with the large amplification obtainable with this type of gauging device, it is imperative that the anvil contact each workpiece with the same pressure and in the same location in order to secure consistent results.

The pivoted gauging arm may be lowered under the influence of gravity into contact with the workpiece, or it may be raised out of contact therewith, by means of an operating arm which is pivotally mounted on the base for rotation about the same axis as the gauging arm and connected therewith by means of a lost-motion connection. By reason of this connection between the arms, the gauging arm may be freed from the influence of the operating arm when the movable anvil rests upon the workpiece. Consequently, the downward pressure of the anvil on the workpiece will be due solely to the force of gravity acting on the arm and there will be no restraint or pressure applied to the gauging arm by the operating arm during the actual gauging operation.

Both the stationary anvil mounted on the base of the gauging device and the movable anvil secured to the gauging arm are arranged so as to permit adjustment of the anvils in setting up a particular job, and to permit removal of the anvils from the gauging device so that other anvils of a different character may be used in setting up the device for a different type of gauging operation. Likewise, the metering pin is arranged for adjustment in the gauging arm so that its relation to the fluid discharge orifice may be adjusted as desired for a particular job. By divorcing the orifice from the anvils, the latter may be of simple, inexpensive construction and they may be readily removed from the gauging device and replaced with other anvils of a different nature so as to permit the checking of a great variety of different parts. Also, different types of checks may be made, such as two-point checks of circular parts, and these checks may be made either of internal diameters or of external diameters with equal facility.

In order to facilitate the two-point checking of the external diameters of workpieces which are circular in form, the gauging device has been provided with a pivoted, workpiece supporting arm provided with means for receiving the part to be checked. The part thus may be swung into and out of gauging position by manipulation of the arm so as to permit rapid checking of the parts undergoing inspection. To further facilitate the checking of parts in this manner, means is provided for locking down the operating arm so that manipulation of this arm by the operator is not required.

In order to provide a clear understanding of the exact nature of our invention and of the many desirable features incorporated therein, a detailed description of a preferred form or embodiment of our invention will now be given and reference will be made to the drawings which accompany and form a part of this specification so as to enable anyone who may so desire to construct a gauging device incorporating our invention.

Figure 1:
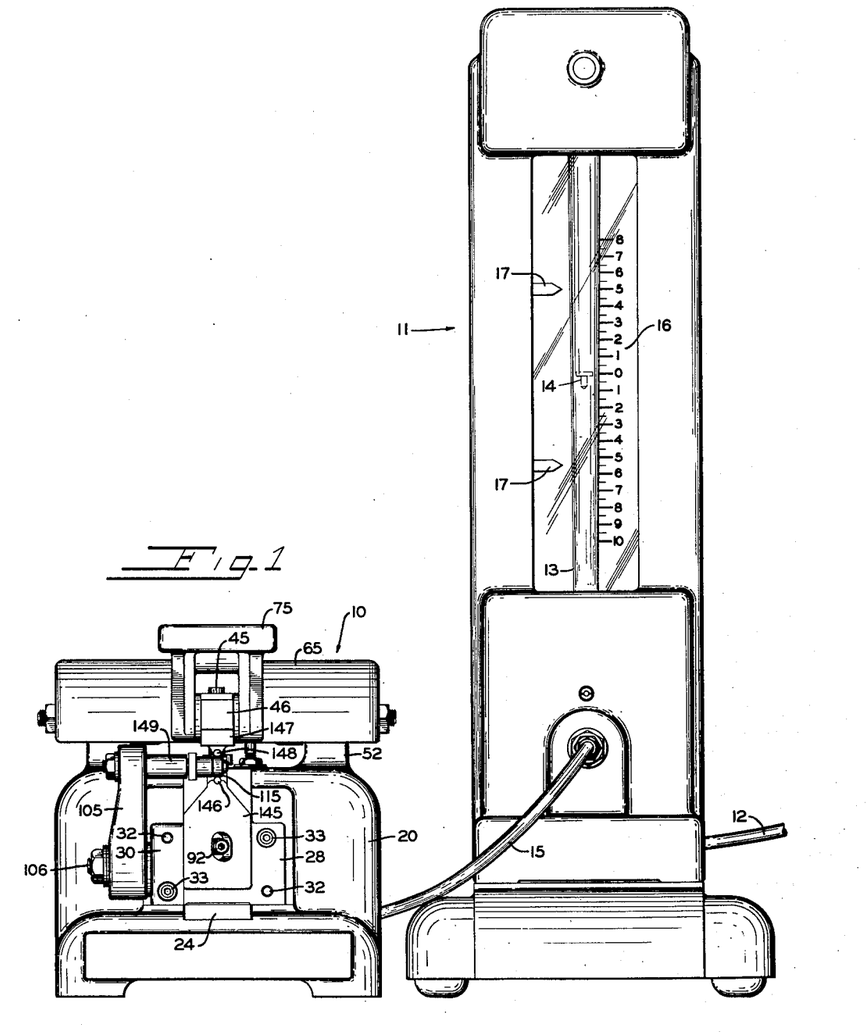
Fig. 1 is a front elevation showing our novel form of gauging device connected with a visual, flow indicator of known construction.

Proceeding now with a detailed description of our novel type of pneumatic gauging device, there is shown in Fig. 1 a typical installation in which a gauging device 10 incorporating the features of our invention is operatively connected with a visual flow indicator 11. In an installation such as this one, it is customary to supply air under constant pressure to an inlet tube 12 which is suitably connected with the lower end of a vertical flow tube 13. The tube 13 is formed of glass or other transparent material and is provided with a bore which tapers from a smaller diameter at the bottom to a larger diameter at the top. An indicator float 14 is freely suspended within the bore of the tube 13 and the upward flow of air through the tube carries the float upwardly therein until it reaches a point where its weight is counterbalanced by the lifting force of the air moving upwardly through the tube. If the flow of air or other gas through the tube is caused to increase, the float will rise in the tube until it reaches a point where the lifting force of the fluid is again counterbalanced by the weight of the float. If, on the other hand, the flow of gas through the tube is reduced, the float 14 will drop until it reaches a new point of equilibrium.

The gas or air, after passing up through the tube, is led out of the instrument through a tube 15 which is connected with the gauging device 10. A reading scale 16 is mounted alongside the float tube 13 so as to permit a reading to be taken of the position of the float 14 within the tube. Also, a pair of adjustable indicators 17 are arranged for vertical sliding movement alongside the tube 13 to enable the tolerances for the various articles being checked to be distinctly indicated.

Figure 2:
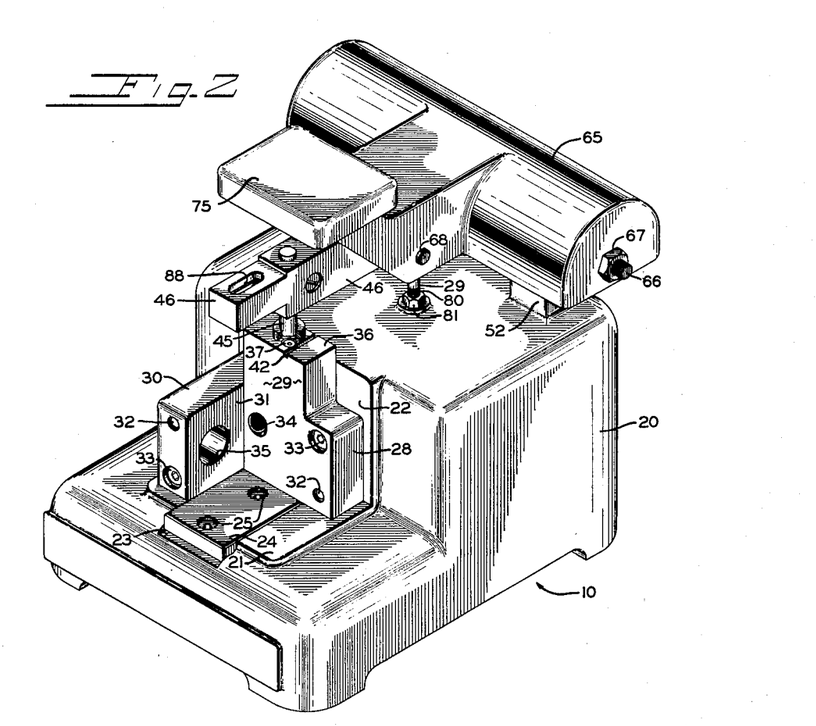
Fig. 2 is a perspective view of the gauging device showing it as it appears with the anvils removed.

As shown in Figs. 1 to 5, inclusive, the gauging device includes a base 20, which is preferably cast from iron or other suitable material, so as to provide a rigid frame for supporting the various constituent parts of the device. The base 20 is provided with an offset at its forward end which is provided with horizontal and vertical machined pads 21 and 22, respectively, as shown in Fig. 2. A horizontal groove or channel 23 is cut in the forward, central portion of the base for receiving a reference block 24 which is held in place by recessed-head bolts 25.

Secured to the pad 22 is an anvil supporting block 28 having a finished face 29 against which a stationary anvil may be clamped. The block 28 is provided with a right-angle extension 30 having a finished face 31 against which the side of the stationary anvil may abut. The block 28 is bored to receive two locating pins 32 projecting from the pad 22, and is adapted to be clamped against the pad by a pair of recessed-head bolts 33. Block 28 is also provided with an inclined, tapped hole 34 for receiving a clamping bolt which passes through the stationary anvil and tends to draw it up against the finished faces 29 and 31. The right-angle extension 30 is provided with a bore 35 for receiving a pivot bolt for a rockable, work-supporting arm as will be more fully described hereinafter.

Figure 4:
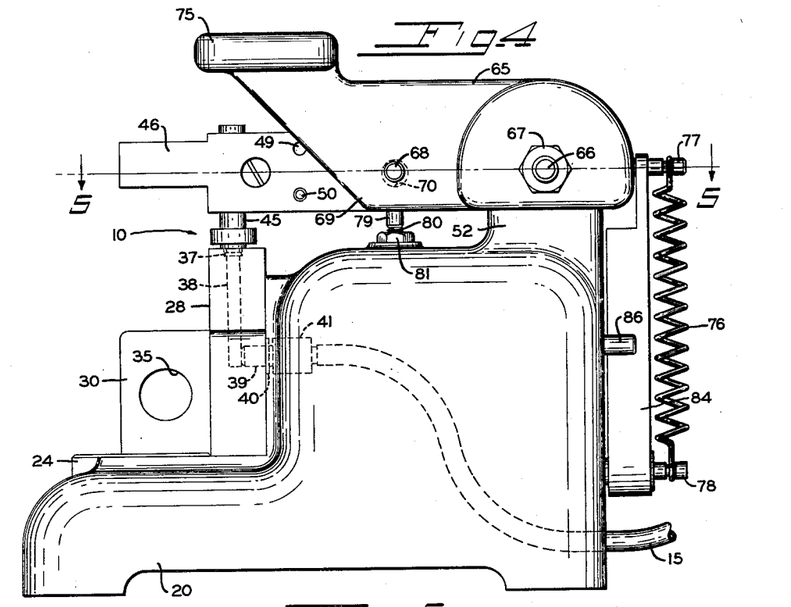
Fig. 4 is a side elevation of the gauging device showing it as it appears with the anvils removed.

The top of the block 28 is provided with a finished face 36 which is recessed to receive a fluid discharge orifice or nozzle 37 as shown in Figs. 2 and 4. Air is supplied to the nozzle from the tube 15 by means of a vertical bore provided in the block 28 which bore, at its lower end, communicates with a horizontal bore 39 which is adapted to register with an aperture provided in the base 20 when the block 28 is clamped against the vertical pad 22. A sealing gasket 40 seated in a recess provided in the pad 22 prevents the escape of air between block 28 and pad 22, and a nipple 41 mounted in the aperture in the base furnishes a connection for the tube 15 leading from the visual indicator 11 (Fig. 1) to the gauging device 10. A relief channel 42 (Fig. 2) is milled in the top face 36 of the block 28 adjacent the nozzle 37 so as to provide an escape path for the air issuing from the nozzle.

Figure 5:
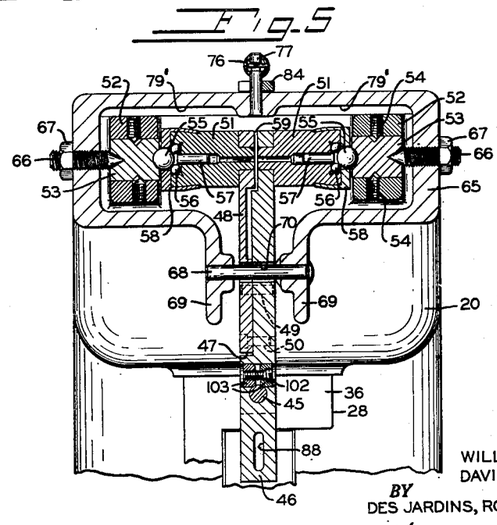
Fig. 5 is a cross sectional view taken along the line 5—5 in Fig. 4.

Cooperating with the nozzle 37 is a metering pin 45 carried in the forward end of a gauging arm 46. As shown in Fig. 5, the arm 46 is stepped down at 47 so as to provide a portion of reduced thickness at the rear end thereof. Secured to the arm 46 behind the step 47 is a spring tongue 48 which is rigidly secured to the arm 46 by means of a pair of locating pins 49 and a pair of screws 50 (see also Fig. 4). At their rearward extremities, the arm 46 and tongue 48 are bored to receive tenons provided on the inner ends of a pair of hubs 51 which are disposed in axial alignment and lie between a pair of upstanding lugs 52 formed on the base 20. The lugs 52 are bored to receive plugs 53 which are adjustable axially within the bores by means of set screws 54 having conical points which engage in conical recesses provided in the sides of plugs 53.

The inner end of each plug 53 is formed with a spherical recess which serves as a seat for a ball 55 and each hub 51 is provided at its outer end with a raceway for receiving a series of small balls 56. The latter balls are held caged in the hub by means of a pin 57 received within an axial bore provided within the hub and a cap 58 extending over the end of the hub and having an aperture formed therein for receiving the ball 55.

The balls 55 and 56 provide a pivot bearing between each hub 51 and its associated plug 53 which supports the arm 46 for free turning movement on the base 20 about a horizontal axis. Due to the resilient connection between the hubs 51 afforded by the spring tongue 48, it is possible to adjust the plugs 53 inwardly by means of the set screws 54 until a slight bias is applied to the tongue 48 so as to cause the hubs to be resiliently pressed outwardly and thereby remove any end play from the pivot bearings. A clearance 59 is provided between the inner ends of the hubs so as to permit this slight biasing of the spring tongue 48. By means of this construction, a substantially frictionless bearing is provided for the arm 46 so that it is free to turn without restraint and without play about the pivotal axis afforded by the pivot bearings.

Also pivoted for rocking movement about the same axis as arm 46, is a T-shaped operating arm 65 which is supported for pivotal movement on the base 20 by means of a pair of pivot screws 66 threaded through the ends of lateral extensions of the arm 65. Each screw 66 is provided with a conical point which engages in a conical seat provided in the outer end of each plug 53. By rotating the screws 66 they may be moved in or out to permit adjustment of the pivot after which they may be locked in place by lock nuts 67.

The operating arm 65 is operatively related with the gauging arm 46 by means of a lost-motion connection comprised of a pin 68 which is supported at either end in flanges 69 depending from the forward end of the arm 65. The pin 68 passes through a bore 70 provided in the arm 46 and the spring tongue 48, the bore 70 being somewhat larger than the pin 68 so as to provide for lost motion between the arm 65 and the arm 46. By virtue of this connection between the arms, the gauging arm 46 may be raised or lowered by raising or lowering the operating arm 65 but, at the same time, may be free to move independently of the arm 65 due to the lost-motion connection.

At its forward end, the operating arm 65 is provided with a pressure pad 75 (Fig. 4) by means of which downward pressure may be applied to the forward end of the arm by the operator's hand. The forward end of the operating arm is normally biased upwardly by means of a tension spring 76 stretched between a pin 77 projecting rearwardly from the back end of the arm 65 and a pin 78 mounted in the rear wall of the base 20. Upward movement of the arm 65 under the influence of spring 76 is limited by engagement of the lower, inner edge 79' (Fig. 5) of the rear end of arm 65 with the upstanding lugs 52 formed on the base 20. Downward movement of the arm 65 is limited by the abutment of a pin 79 (Fig. 4), projecting downwardly from flange 69 of arm 65, against an adjustable screw 80 mounted in the upper portion of the base 20. The screw 80 is threaded into the base and may be locked in adjusted position by a lock nut 81. Hence, the downward travel of the arm 65 will be limited by engagement of the bottom of pin 79 with the top of screw 80, and the lowered position of the arm 65 may be adjusted by turning the screw 80.

Figure 3:
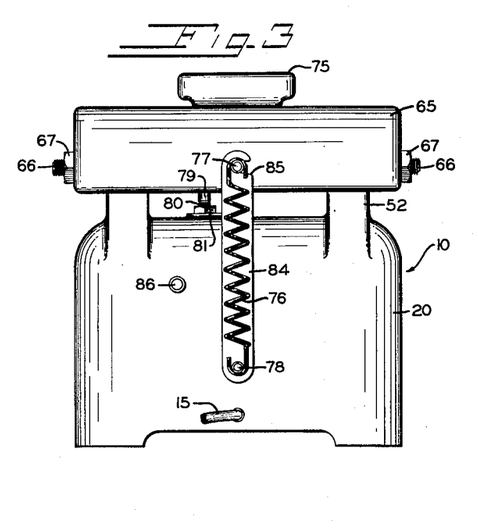
Fig. 3 is a rear elevation of the gauging device showing details of the biasing spring and lock for the operating arm.

In certain types of gauging operations it is desirable to maintain the operating arm 65 in its lowered position with the pin 79 abutting against the top of the screw 80. For this purpose, a lock is provided for holding the arm in its lowered position against the urgency of the spring 76. As best shown in Figs. 3 and 4, this lock consists of a bar 84 which is pivoted at its lower end on the pin 78. At its upper end the bar 84 is provided with a slot 85 adapted to engage under the pin 77, mounted in the rear end of the operating arm and thereby hold that arm down against the urgency of the spring 76. The lower edge of the slot 85 is preferably provided with a slight upward inclination so as to provide a caming action on the underside of pin 77 and thereby cause the lower end of pin 79 to be firmly pressed against the top of screw 80. A pin 86 projecting from the rear wall of the base 20 limits counterclockwise movement of the bar 84, as viewed in Fig. 3, when the bar is swung away from the pin 77 so as to unlock the operating arm 65.

Figure 7:
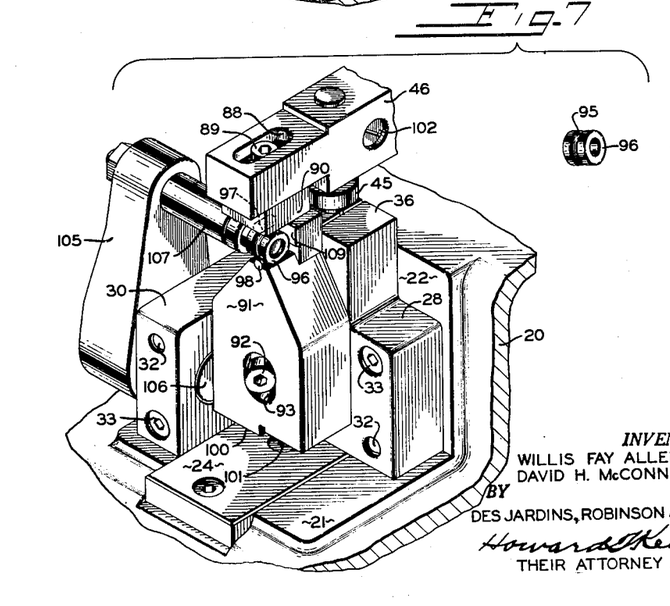
Fig. 7 is a fragmentary perspective view showing the anvils used for making a two-point check of the raceway formed in an inner bearing race or cone which is also shown in this view.

At its forward end, the gauging arm 46 is provided with an elongated, shoulder slot 88 (Fig. 2) for receiving the head of clamping bolt 89 (Figs. 7, 8 and 9) which is adapted to screw into an anvil, such as the anvil 90 shown in Fig. 7, and hold the latter in place on the forward end of the arm 46. As shown in Fig. 7, the anvil 90 is adapted to lie above a stationary anvil 91 clamped against the block 28 by means of a bolt 92 threaded into the inclined hole 34 (Fig. 2) provided in the block 28. The head of the bolt 92 is received within an elongated, shouldered slot 93 provided in the forward face of the anvil 91. In the arrangement shown in Fig. 7, the gauging device is set up to provide a two-point check of the diameter of a race 95 provided in a cone 96 of a ball bearing. For this purpose, the movable anvil 90 is provided with a gauging pin 97 which is adapted to bear against the top of the race 95, while the stationary anvil 91 is provided with a gauging pin 98 which is adapted to engage against the bottom of the race. Accordingly, when the operating arm 65 is depressed, the gauging arm 46 will be permitted to move downwardly under the influence of gravity until the gauging pin 97 comes in contact with the top of the race 95. At the same time, the metering pin 45 carried by the arm 46 will move down over the fluid discharge orifice 37 thereby restricting the flow of air or gas through the orifice. Assuming that the gauging apparatus has been previously adjusted so that the flow indicator 11 (Fig. 1) will indicate zero when a standard or master cone is brought between the anvils 90 and 91, any deviation of the race of the cone 96 from the standard will be indicated by the float 14 of the indicator 11. If the race 95 is undersize, float 14 will fall in the tube and indicate to what extent the race is undersize. If the race is oversize, the float 14 will rise in the tube and indicate to what extent the race is oversize. If the stationary indicators 17 have previously been set to indicate the tolerance limits for the cone being checked, movement of the float above or below the indicators 17 will indicate that the cone is outside the tolerance limits and must be rejected.

To facilitate proper adjustment of the gauging device for the particular part being checked, the fixed anvil 91 may be adjusted up or down by loosening the clamping bolt 92 whereupon the elongated slot 93 in the anvil will permit the same to be raised or lowered on the block 28. The bottom surface of the anvil 91 is preferably provided with locating surfaces 100 and 101 so as to permit the use of gauge blocks between these surfaces and the reference block 24 to facilitate the vertical adjustment of the anvil 91. The movable anvil 90 may likewise be adjusted horizontally by loosening the bolt 89 and sliding the anvil lengthwise of the arm 46. Also, the metering pin 45 may be adjusted up or down by loosening the clamping screw 102, thereby releasing clamping collars 103 (Fig. 5) so that the pin may be raised or lowered to the desired position and thereafter clamped in place by tightening the screw 102.

To facilitate the gauging of large numbers of cones 96 or the like, the gauging device may be provided with a pivoted work-supporting arm 105 (Fig. 7) which is journaled at its lower end on a pivot bolt 106 received within the aperture 35 (Fig. 2). At its upper end, the arm 105 is provided with a laterally extending arbor 107 which, at its outer end, is provided with a tenon on which the bearing cone 96 may be placed. After the cone has been placed on the arbor 107, the arm 105 may be rocked rearwardly so as to carry the cone between the gauging pins 97 and 98, the rearward movement of the cone being limited by a stop pad 109 provided on the upper end of the stationary anvil 91. When the arbor 107 is rocked forwardly to remove the cone from between the anvils, the arm 46 will drop slightly until the bottom of the metering pin 45 comes into contact with the top face 36 of the block 28, or until the upper surface of the pin 68 makes contact with the top of the hole 70 in the gauging arm. It is to be realized, of course, that for each particular gauging job, the screw 80 must be at such an elevation that when the part being checked is positioned between the anvils, there will be clearance between the orifice and the bottom of the metering pin 45, and clearance will exist between the pin 68 and the hole 70 so that the gauging arm 46 will be free to move up or down independently of the operating arm 65. In this way, the arm 46 will be free to move under the influence of gravity and the pressure of the movable anvil 90 against the part being checked will be due solely to the force of gravity acting on the arm 46. When gauging parts with the aid of the arbor 107, it is desirable to lock the arm 65 in a lowered position by means of the lock bar 84 so as to eliminate the necessity of depressing the operating arm each time a cone is brought into position between the anvils.

Figure 6:
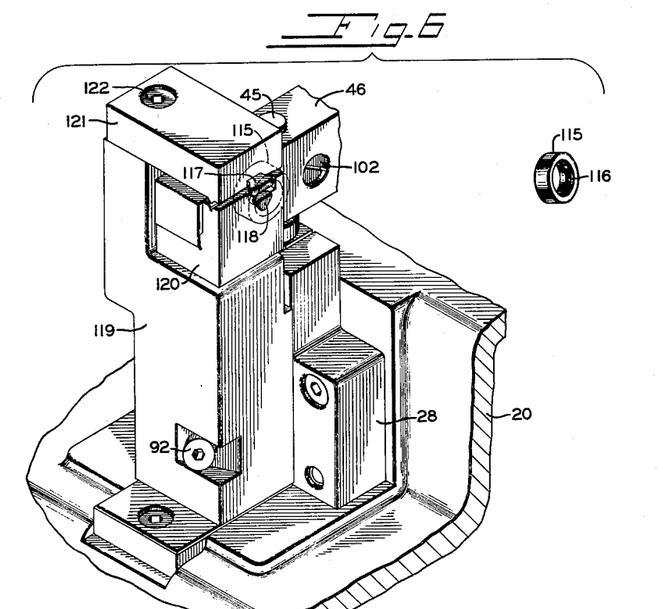
Fig. 6 is a fragmentary perspective view showing the anvils used for checking the internal diameter of a bearing cup which is also shown in this view.

In Fig. 6 the gauging device is shown set up to check the internal surface of a machined part. As here shown, a bearing cup 115 having a race 116 is placed over the gauging nibs 117 and 118 provided on a stationary anvil 119 and a movable anvil 120, respectively. In this application of the device, the stationary anvil 119 is bolted in place against the block 28 by means of clamping bolt 92, while the movable anvil 120 is secured to the gauging arm 46 by means of the clamping bolt 89 (not shown). The anvil 119 is provided with a removable block 121 which is held in place on the anvil 119 by a bolt 122. By removing the bolt 122, the block 121 may be removed from the anvil 119 thereby permitting access to the clamping bolt 89 for the movable anvil 120. After the anvil 120 is clamped to the arm 46, the block 121 may be bolted to the anvil 119 in the manner shown in Fig. 6.

The gauging nib 117 projects outwardly and is adapted to contact the race 116 of the cup 115 at two points located above the horizontal centerline of the race, while the nib 118, carried by the movable anvil 128, is adapted to contact a point at the bottom of the race.

To operate the gauging device with the set-up illustrated in Fig. 6, the locking bar 84 should be swung to its inoperative position so as to free the operating arm 65 to the action of spring 76. Upward movement of the arm 65 under the influence of spring 76 will cause the upper edge of the arm 46 to abut against the under side of the block 121 and cause the gauging nibs 117 and 118 to come together. After a bearing cup 115 is placed in position over the gauging nibs, the operating arm is manually depressed by applying pressure to the pad 75 thereof so as to bring the limit pin 79 into contact with the adjusting screw 80. This will cause the gauging arm 46 to move downwardly and bring the nib 118 into contact with the bottom of the race 116. At the same time, the nib 117 will make contact with the race 116 at two locations above the horizontal centerline of the race so as to effect a three-point check of the bearing cup race. In this case, if the race is oversize, the float 14 (Fig. 1) will move downwardly in the tube 13, whereas if the race is undersize, the float 14 will move upwardly in the tube.

Figure 8:
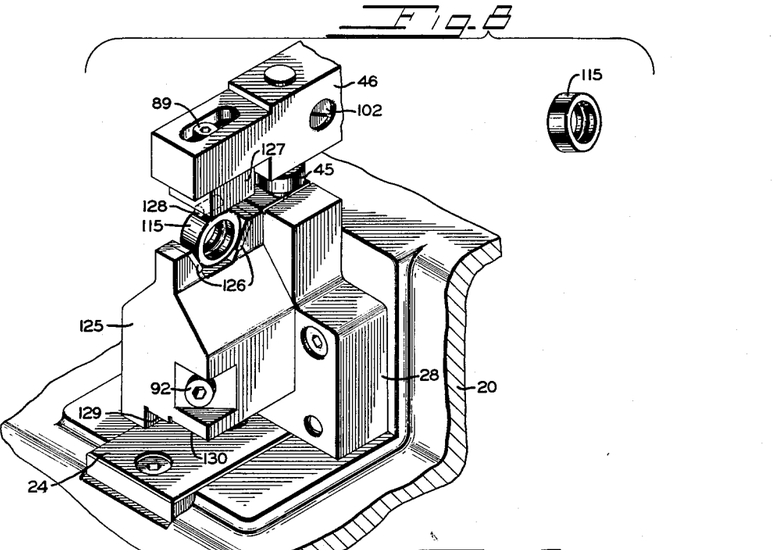
Fig. 8 is a fragmentary perspective view showing the anvils used for making a three-point check of the bearing cup.

A three-point check of the outside face of the bearing cup 115 may be effected by the use of the setup shown in Fig. 8. As herein shown, a stationary anvil 125 is clamped in place against the block 28 by means of clamping screw 92. The anvil 125 is provided with a pair of opposed, inclined gauging pads 126 which are adapted to contact the underside of the cup 115 at two points on either side of the vertical center line. A movable anvil 127 carrying a gauging pin 128 may be clamped to the gauging arm 46 by clamping bolt 89 so that, when the arm is lowered, the pin 128 will contact the top of the cup 115. The bottom of the stationary anvil 125 is provided with a pair of gauging surfaces 129 and 130 so as to permit the use of gauge blocks for adjusting the anvil to the proper elevation with respect to the reference surface 24.

The operation of the gauging device with the setup illustrated in Fig. 8 is as follows:

The lock bar 84 for the operating arm is swung to its ineffective position against the pin 86 thereby permitting the operating arm 65 to lift the gauging arm 46 to its raised position. The bearing cup 115 to be checked is then placed on the stationary anvil 125 in the position shown in Fig. 8. The operating arm is then depressed by applying pressure to the pad 75 so as to bring the pin 79 into contact with the adjusting screw 80. The gauging pin 128 of the movable anvil 127 will make contact with the top of the cup 115 and the flow indicator 11 (Fig. 1) will provide an indication of the oversize or undersize condition of the cup 115 as compared with a standard or master.

Figure 9:
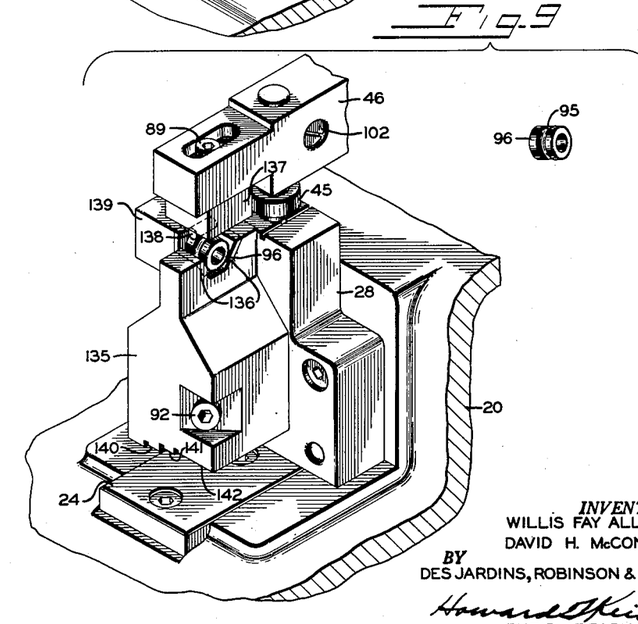
Fig. 9 is a fragmentary perspective view showing the anvils used for making a three-point check of the inner bearing.

In Fig. 9 the gauging device is shown as it might be set up to provide a three-point check of the outer periphery of the bearing cone 96. As shown in Fig. 9, a stationary anvil 135 having a pair of opposed, inclined gauging pads 136 is clamped in position against the block 28 by clamping bolt 92. The pads 136 are so arranged as to make contact with the underside of the cone 96 at two locations on opposite sides of the vertical center line. A movable anvil 137 provided with a gauging pin 138 is secured to the gauging arm 46 by means of clamping screw 89. In order to insure proper positioning of the cone 96 on the stationary anvil so that gauging pin 138 of movable anvil 137 will contact the cone to one side of the race 95, a stop block 139 is secured to the stationary anvil 135 so as to serve as an end stop for the cone when it is placed on the anvil. The stationary anvil is shown provided with three gauging surfaces, 140, 141 and 142, on its bottom face so as to facilitate proper vertical adjustment of the anvil on the block 28 by the use of gauge blocks interposed between the reference block 24 and the surfaces 140, 141 and 142.

The operation of the gauging device when set up as shown in Fig. 9 for making a three-point check of the peripheral face of the bearing cone 96 is as follows:

The operating arm 65 is freed to the action of spring 76 by swinging the lock bar 84 over against the pin 86. The bearing cup 96 to be checked is then placed on the stationary anvil in the position shown in Fig. 9 whereupon the operating arm is depressed by applying pressure to the pad 75 thereof until the downward travel of the arm is stopped by engagement of pin 79 against adjusting screw 80. The movable anvil 137 will thereby be lowered to bring gauging pin 138 into contact with the top surface of the cone 96. If the relation of the bottom surface of the metering pin 45 with respect to the orifice 37 is the same as it was when the standard or master was placed in position between the anvils, the float 14 of the flow indicator 11 will move to the zero position on the scale thereby indicating that the size and shape of the race is identical with that of the master. However, if the cone is undersize, the bottom of the metering pin 45 will lie closer to the orifice 37 and impose a greater restriction on flow of air through the orifice and so cut down the flow of air through the tube 13 of the indicator 11. Consequently, the float 14 will drop in the tube and indicate the extent to which the cone is undersize. In case the cone is oversize, the bottom of the metering pin 45 will lie further above the orifice 37 than when the standard was in place between the anvils and, therefore, the flow of air through the orifice will be greater than it was when the standard was checked. Consequently, the float 14 will rise in the tube 13 and indicate to what extent the cone is oversize as compared with the standard.

Fig. 1 of the drawing shows the setup which may be employed in making a two-point check of the outside diameter of the bearing cup 115. As here shown, a stationary anvil 145 having a gauging pin 146 provided thereon is clamped in position against the block 28 by clamping bolt 92. A movable anvil 147 carrying a gauging pin 148 is clamped to the gauging arm 46 in the manner previously described. In order to facilitate rapid checking of the cups 115, a suitable arbor 149 is bolted to the upper end of pivoted arm 105 and the cups to be checked may be placed on the arbor and thereafter moved into gauging position between the anvils 145 and 147. The operating arm 65 is preferably locked down by use of the lock bar 84 so that no manipulation of the arm is required for the checking of the parts.

The operation of the apparatus when set up as shown in Fig. 1 is as follows:

The arm 105 is rocked forwardly and a cup to be checked is placed on the arbor 149. The arm is then rocked rearwardly so as to move the cup between the gauging pins 146 and 148 thereby causing the gauging arm 46 to be elevated slightly. If the cup 115 is identical in diameter with the standard, the float 14 will come to rest in the position shown in Fig. 1 opposite the "0" mark on the scale 16. However, if the cup 115 is oversize, the bottom of the metering pin 45 will lie slightly higher above the orifice 37 than normal, and the flow of air through the tube 13 will be greater, thus causing the float 14 to rise within the tube. If the cup 115 is undersize, the metering pin 45 will lie somewhat closer than normal to orifice 37, and the flow of air through the tube 13 will be less than in the case of the standard, so that the float 14 will drop in the tube. After the deviation of the cup 115 from the standard has been noted, the arm 105 may be rocked forward and the cup removed from the arbor 149. This procedure may then be repeated for each cup 115 which is to be checked.

It will be noted from the foregoing description of our invention that by divorcing the fluid metering portion of the apparatus from the gauging anvils, we are able to provide a gauging device having much greater flexibility than was possible with previous devices. It is possible with our improved form of gauging device to change the setups for various types of gauging jobs with but little time and expense since the anvils are simple in design and easy to adjust for gauging parts which differ in size. Therefore, although we have described our invention in considerable detail and have utilized certain specific terms and language herein, it is to be understood that the present disclosure is illustrative rather than restrictive and that changes and modifications may be resorted to without departing from the spirit of the claims which are appended hereto and which define the scope of our invention.

Having thus described our invention, what we claim as new and useful and desire to secure by United States Letters Patent is:

1. A gauging device in which a leakage flow of fluid is utilized in comparing the size of a workpiece with a standard, comprising a base; a stationary anvil secured to said base; a gauging arm pivoted on said base; an anvil carried by said arm at one end thereof for movement toward or away from said stationary anvil; cooperating means on said base and on said arm for metering the flow of fluid through said gauging device when the movable anvil is moved relative to the stationary anvil; said means including an orifice, and a metering element for controlling the flow of fluid through said orifice; a manipulable arm supported on said base for controlling the movement of said gauging arm; and a connection between said manipulable arm and said gauging arm for permitting relative movement between said arms.

2. The gauging device of claim 1 including a stop on said base for limiting movement of said manipulable arm as it controls the movement of said movable anvil toward said stationary anvil.

3. The gauging device of claim 2 in which said stationary anvil is detachably and adjustably secured to said base and said movable anvil is detachably and adjustably secured to said arm.

4. The gauging device of claim 3 wherein said metering element is carried by said gauging arm and is capable of adjustment thereon relative to said orifice defining means and wherein said stop is adjustable with relation to said operating arm.

5. A gauging device for comparing the size of a workpiece with a standard comprising a base, means on said base for receiving a stationary anvil, a gauging arm pivoted on said base for rocking movement about a horizontal axis, means on the free end of said arm for receiving a second anvil, means defining a fluid discharge orifice situated on said base beneath said arm, a metering element carried by said arm and cooperating with said orifice defining means for controlling the flow of fluid therethrough in accordance with the deviation of a workpiece from a standard, an operating arm pivoted on said base for rotation about the same axis as said gauging arm, and a lost-motion connection between said operating arm and said gauging arm.

6. A gauging device for comparing the size of an aperture in a workpiece with the size of an aperture in a standard, comprising a base, a stationary anvil secured to said base, an upper gauging nib carried by said anvil, a gauging arm pivoted on said base to turn about a horizontal axis, a movable anvil secured to the free end of said arm, a lower gauging nib carried by said movable anvil and lying beneath said upper gauging nib, means defining a fluid discharge orifice situated on said base beneath said arm, and a metering element carried by said arm and cooperating with said orifice defining means for controlling the flow of fluid therethrough in accordance with the relative positioning of said nibs when said arm is lowered with a workpiece engaged over said nibs.

7. The gauging device of claim 6 including an operating arm pivoted on said base for rotation about the same axis as said gauging arm, and a lost-motion connection between said operating arm and said gauging arm.

8. A gauging device for comparing the size of a workpiece with a standard comprising a base, a stationary anvil secured to said base for contacting one portion of a workpiece, a movable anvil for contacting another portion of the workpiece, an arm for supporting said movable anvil, and means for supporting said arm on said base for rocking movement about a horizontal axis, said means including a pair of horizontally spaced supports on said base, a pair of axially-aligned, spaced-apart hubs situated between said supports, a combined radial and axial thrust bearing disposed between the outer end of each hub and one of said supports for pivotally supporting said hubs on said supports, and means on said arm for supporting the inner ends of said hubs and for applying a resilient, axially-directed, outward thrust on each of said hubs, whereby a constant and equal endwise thrust will be applied to each of said bearings.

9. The gauging device of claim 8 in which said last-mentioned means includes a leaf spring for providing a resilient connection between the inner ends of said hubs.

10. The gauging device of claim 9 wherein the spacing between said supports may be adjusted within limits so as to enable a suitable bias to be placed on said leaf spring.

11. The gauging device of claim 8 in which each bearing includes a series of balls caged in the outer end of one of said hubs, and a pivot ball interposed between said series of balls and one of said supports.

12. A gauging device for comparing the size of a workpiece with a standard comprising a base; a pair of opposed anvils for contacting opposite sides of the workpiece including a stationary anvil fixed with respect to said base and a movable anvil supported on said base for movement toward or away from said stationary anvil; a rectangular mounting block for supporting said stationary anvil; and means for accurately locating and fastening said mounting block on said base including a pair of finished faces on said base disposed at right angles to one another, said faces being adapted to engage with one face and one side respectively, of said anvil mounting block; and means passing through said block and into said base for drawing the block firmly into contact with both of said faces to accurately position said stationary anvil on said base.

13. A gauging device for comparing the size of a workpiece with a standard comprising a base; a pair of opposed anvils for contacting opposite sides of the workpiece including a stationary anvil fixed with respect to said base and a movable anvil supported on said base for movement toward or away from said stationary anvil; and means for accurately locating and fastening said stationary anvil in place on said base, including a vertical locating face on said base, a horizontal gauging pad on said base at the foot of said locating face, a gauging pad on the bottom surface of said stationary anvil, a vertically elongated hole in said stationary anvil, and a clamping bolt passing through said hole and into said base so that the vertical positioning of said anvil on said base may be determined by a gauge block interposed between said gauging pads before the block is fastened in place by said clamping bolt.

14. A gauging device for comparing the size of a workpiece with a standard comprising a base; a pair of opposed anvils for contacting opposite sides of the workpiece including a stationary anvil fixed with respect to said base and a movable anvil supported on said base for movement toward or away from said stationary anvil; and means for accurately locating and fastening said stationary anvil in place on said base including a pair of vertical locating faces on said base disposed at right angles to one another, said faces being adapted to engage with one face and one side, respectively, of said stationary anvil, a horizontal gauging pad on said base at the foot of said locating faces, a gauging pad on the bottom surface of said stationary anvil, a vertically elongated hole in said stationary anvil, and a clamping bolt passing through said hole and into said base, said bolt being inclined to both of said locating faces, whereby a gauge block may be interposed between said gauging pads so as to accurately determine the vertical positioning of said stationary anvil on said base after which said bolt may be tightened to draw the anvil firmly into contact with both of the locating faces thereby accurately locating and fastening the stationary anvil in place on said base.

15. A gauging device for comparing the size of a workpiece with a standard comprising a pair of anvils for contacting opposite sides of the workpiece; means for supporting one of said anvils for movement toward or away from gauging position; a workpiece carrying arm for moving a workpiece into or out of position between said anvils; means for operating said supporting means to move said one anvil into gauging position, said means including a manipulative member movable from a normal position to a gauging position, means for biasing said member into its normal position, and a lost-motion connection between said manipulative member and said supporting means; and lock means for holding said manipulative member in its gauging position whereby a workpiece supported on said carrying arm may be moved into position between said anvils and gauged without manual operation of said manipulative member.

16. A gauging device for comparing the size of a workpiece with a standard comprising a base, a stationary anvil secured to said base for contacting one portion of the workpiece, a movable anvil for contacting another portion of the workpiece, an arm for supporting said movable anvil, and means for supporting said arm on said base for rocking movement about a horizontal axis including a combined radial and axial thrust bearing interposed between said arm and said base, and means for maintaining the end thrust on said bearing substantially constant.

17. The gauging device of claim 16 wherein said last-recited means includes a pressure applying device on said arm for maintaining the end thrust substantially constant.

18. The gauging device of claim 17 wherein said pressure applying device includes a leaf spring carried by said arm.

19. A gauging device in which a metered flow of fluid is utilized in comparing the size of a workpiece with a standard comprising a base, a pair of relatively movable anvils mounted on said base for contacting opposite sides of the workpiece, said anvils being normally biased to move toward one another and into contact with the workpiece, means for metering the amount of fluid flowing through the device in accordance with the relative positions of said anvils, said means including an orifice and a metering element for controlling the flow of fluid through said orifice, a manipulable arm supported on said base for controlling the relative movement of said anvils, said arm being normally biased to move in one direction so as to overcome the bias on said anvils and cause the same to separate, and means, including an abutment on said base, for removing the control of said manipulable arm over said anvils when said arm has been manually moved in the opposite direction to permit said anvils to contact opposite sides of the workpiece.

20. A gauging device in which a metered flow of fluid is utilized in comparing the size of a workpiece with a standard comprising a base; a stationary anvil mounted on said base; a movable anvil operating in conjunction with said stationary anvil to contact opposite sides of the workpiece; a gauging arm carrying said movable anvil, said arm being pivoted on said base and being normally biased to move said movable anvil toward said stationary anvil; means on said base and on said arm for metering the amount of fluid flowing through the gauging device in accordance with the relative positions of said anvils, said means including an orifice, and a metering element for controlling the flow of fluid through said orifice; and means for controlling the movement of said gauging arm, including a manipulable arm supported on said base and biased for movement in one direction, a connection between said manipulable arm and said gauging arm for enabling said arm, when moved in said one direction, to pick up said gauging arm and move said movable anvil away from said stationary anvil and, when manually moved in the opposite direction, to free said gauging arm and permit said movable anvil to move toward said stationary anvil, and an abutment on said base cooperating with said operating arm for limiting movement of the latter arm in said opposite direction.

21. The gauging device of claim 20 wherein said stationary anvil is detachably and adjustably secured to said base, and said movable anvil is detachably and adjustably secured to said arm.

22. The gauging device of claim 21 wherein said abutment is adjustable with relation to said operating arm.

23. A gauging device for comparing the size of a workpiece with a standard, comprising a base, a stationary anvil secured to said base, a gauging arm pivoted on said base for rocking movement about a horizontal axis, an anvil secured to the free end of said arm above said stationary anvil, a manipulable arm for controlling the movement of said gauging arm, means defining a fluid discharge orifice mounted in fixed relation with respect to said base, and a metering element located in said arm above said orifice defining means, said element being disposed between said movable anvil and the pivot for said arm.

24. The gauging device of claim 23 including a lost-motion connection between said gauging arm and said manipulable arm.

25. The gauging device of claim 24 including means for biasing said arms in opposite directions, the bias on said manipulable arm being greater than that on said gauging arm and acting in a direction to carry the gauging arm away from said stationary anvil.

26. The gauging device of claim 25 including a stop for limting the downward travel of said manipulable arm.

27. The gauging device of claim 25 including a lock for holding said manipulable arm in lowered position against the urgency of said biasing means.

28. The gauging device of claim 25 wherein said biasing means includes a spring for lifting the free end of said manipulable arm.

References Cited in the file of this patent

UNITED STATES PATENTS

| Number | Name | Date |
|---|---|---|
| 2,190,306 | Buisiger | Feb. 13, 1940 |
| 2,431,021 | Bourdelais | Nov. 18, 1947 |
| 2,515,418 | Newton | July 18, 1950 |

FOREIGN PATENTS

| Number | Country | Date |
|---|---|---|
| 342,064 | Germany | Oct. 12, 1921 |
| 341,365 | Great Britain | Jan. 15, 1931 |
| 601,908 | Great Britain | May 14, 1948 |